United States Patent [19]

Kojima et al.

[11] Patent Number: 4,527,175

[45] Date of Patent: Jul. 2, 1985

[54] INK SUPPLY SYSTEM FOR NONIMPACT PRINTERS

[75] Inventors: Tamotsu Kojima; Masayoshi Miura, both of Kawasaki; Gen Oda, Sagamihara, all of Japan

[73] Assignee: Matsushita Electric Industrial Company, Limited, Japan

[21] Appl. No.: 445,836

[22] Filed: Nov. 30, 1982

[30] Foreign Application Priority Data

Dec. 2, 1981 [JP] Japan ............................... 56-194066
Dec. 4, 1981 [JP] Japan ............................... 56-195921

[51] Int. Cl.[3] ............................................ G01D 15/16
[52] U.S. Cl. ................................................ 346/140 R
[58] Field of Search .................................... 346/140 R

[56] References Cited

U.S. PATENT DOCUMENTS

| | | | |
|---|---|---|---|
| 2,176,777 | 10/1939 | Tate | 346/140 R |
| 2,214,636 | 9/1940 | Hutchens | 346/140 X |
| 3,327,315 | 6/1967 | Felton | 346/140 R |
| 3,373,435 | 3/1968 | Strong | 346/140 R |
| 3,747,120 | 7/1973 | Stemme | 346/140 R X |
| 3,787,884 | 1/1974 | Demer | 346/140 R X |
| 4,188,634 | 2/1980 | Anderka et al. | 346/140 R X |
| 4,323,907 | 4/1982 | Italiano | 346/140 R |
| 4,422,086 | 12/1983 | Miura | 346/140 R |

OTHER PUBLICATIONS

Hendriks et al.; Pressure Surge Annihilator for Ink Jet Heads; IBM TDB, vol. 21, No. 12, May 1979, pp. 5062-5063.

*Primary Examiner*—Joseph W. Hartary
*Attorney, Agent, or Firm*—Lowe, King, Price & Becker

[57] ABSTRACT

In a nonimpact printer having a reciprocable printer head, ink is supplied to the head through a pair of identical, flexible conduits which are connected from first and second spaced apart outlets of an ink container. The container is not air tight with the outside so that it can act as a pressure absorber. Each of the first and second conduits have a sufficient length to allow the head to reciprocate along the length of a platen with end of each conduit moving therewith to cause pressure variations to occur in the conduits when the printer head varies its speed of movement. By virtue of the pressure absorbing action of the liquid container, the pressure variations are nullified and the printer head is supplied with constant pressure ink.

16 Claims, 4 Drawing Figures

INK SUPPLY SYSTEM FOR NONIMPACT PRINTERS

CROSS REFERENCE

The present invention relates to copending U.S. patent application Ser. No. 340,811, filed Jan. 19, 1982 by M. Miura et al, titled "Device for Feeding Constant Pressure Fluid" now issued as U.S. Pat. No. 4,422,086 on Dec. 20, 1983.

BACKGROUND OF THE INVENTION

The present invention relates generally to nonimpact printers, and in particular to a liquid supply system for such printers in which the printer head reciprocates across the surface of a recording sheet during each line scan.

In nonimpact printers of the above type, the printer head moves at such a high speed that a pressure variation occurs when the head makes a reversal at each end of the line scan path due to the inertial force of the liquid which is supplied through flexible conduits connected to the head.

A nonimpact printer shown and described in Japanese Patent No. 54-10449 comprises a loop of flexible liquid supply conduit having first and second half sections. One end of each half section is connected together with one end of the other section to an ink source and the other end of each section is connected together with the other end of the other section to a nonimpact printer head. The pressure variation that occurs in each of the half section of the loop is opposite to the pressure variation in the other half, such pressure variations could be cancelled out each other.

However, due to the flow resistance which exists in the inner wall of the supply conduit and its curvature of the conduit, the movement of liquid still tends to be converted into pressure variations which are not satisfactorily eliminated by the cancelling effect. The problem becomes particularly severe when an ink jet printer head of the on-demand type as disclosed in U.S. Pat. No. 3,747,120 is employed. More specifically, the pressure variation needs to be suppressed to a level below 0.033 kilogram/centimeter sqaure. If this value is exceeded undesirable ink droplets are discharged in response to a pressure increase and the meniscus of the ink is broken in response to a pressure decrease generating undesirable bubbles in the liquid chamber.

SUMMARY OF THE INVENTION

An object of the invention is to provide a liquid ssupply system for a nonimpact printer having a reciprocable printer head, comprising container means for holding the liquid therein and having first and second spaced apart outlets, the container means acting as a pressure absorber for nullifying liquid pressure variations applied thereto through the outlets, connecting means having a common outlet channel connected to the printer head for movement therewith and a pair of opposed first and second inlet channels for communicating liquid to the outlet channel, and a pair of first and second identical, flexible conduits respectively connected from the first and second outlets to the first and second inlet channels, each of the first and second conduits having a greater length than the maximum distance between the respective outlet of the container means and the respective inlet channel of the connecting means so that one end of each conduit is movable with the printer head to cause pressure variations to occur in the conduits when the printer head varies its speed of movement.

Another object of the invention is to provide a liquid supply system having first valve means located in the first conduit and second valve means located in the second conduit. Each of the valve means comprises a tubular member having opposite open ends and an intermediate portion with a larger cross-sectional area than the cross-sectional area of each the open end, and a valve member freely movable in the tubular member between the open ends for closing one of the open ends under the pressure of liquid in the respective one of the conduits.

A further object of the invention is to provide a liquid supply system in which the connecting means comprises a pair of first and second identical chambers respectively connected to the first and second conduits, a connecting channel by which the first and second chambers are interconnected, the cross-section of the connecting channel being smaller than the cross-section of the first and second chambers, and a passageway through which the connecting channel is in communication with the printer head.

BRIEF DESCRIPTION OF THE DRAWINGS

The present invention will be described in further detail with reference to the accompanying drawings, in which.

DETAILED DESCRIPTION

Figure 1:
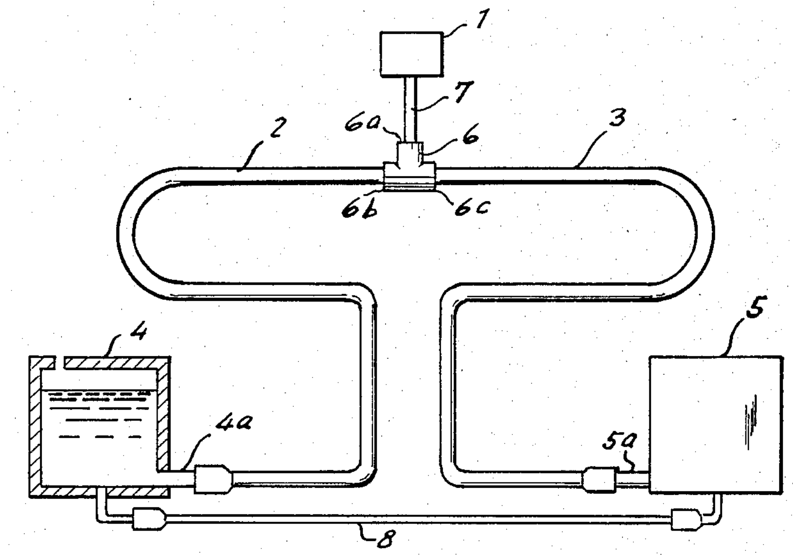
FIG. 1 is a schematic diagram of an embodiment of the present invention.

A first embodiment of the ink supply system of the invention for nonimpact printers is schematically illustrated in FIG. 1. The system includes a pair of flexible conduits 2 and 3 having equal lengths and equal inner diameters. These conduits are connected from outlets 4*a* and 5*a* of ink containers 4 and 5, respectively, to a T-joint 6 and thence through a common passage 7 to an ink jet printing head 1 which is preferably of the type shown and described in U.S. Pat. No. 3,747,120. The T-joint 6 is formed with an outlet channel 6*a* and a pair of opposed inlet channels 6*b* and 6*c* with which the conduits 2 and 3 are respectively coupled, and is preferably of the type as disclosed in the aforesaid copending U.S. Pat. No. 4,422,086 to minimize the effect of pressure variations in conduit 2 and 3 on the head 1.

The printing head includes a piezoelectric transducer responsive to an electrical impulse applied thereto to generate a pressure increase in a liquid chamber to cause a droplet of ink to discharge through an orifice. A sucking action is subsequently generated in the liquid chamber to replenish the ink from the ink sources 4 and 5. The printing head 1 is disposed in proximity to a platen, not shown, on which a sheet of paper is wrapped to receive the discharged ink droplets, and is mounted on a suitable carriage to reciprocate in a known manner along the length of the platen during line scan, while the platen is successively rotated to advance the sheet by the width of a line scan. The conduits 2 and 3 each have a slightly greater length than the maximum distance between the outlet of the respective container and the respective inlet channel of the T-joint 6 to form curved paths for the liquid to allow it to flow as smooth as possible.

The ink containers 4 and 5 are partially filled with air therein so that the surface of the liquid may vary in response to pressure variations in conduits 2 and 3 in order to serve as a buffer for absorbing them. Therefore, when the head 1 reverses the direction of motion at the left end of its travel the resultant rapid pressure increase in conduit 2 is absorbed in the ink container 4. On the other hand, the rapid pressure decrease in conduit 3 is nullified by the ink container 5 by supplying it with a small amount of ink. When the head makes a reversal at the right end of its travel, then the container 5 acts as an absorber for the pressure increase in conduit 3 and the container 4 acts as an absorber for the pressure decrease in conduit 2. Therefore, the pressure variations affecting the printer head 1 are reduced significantly.

The containers 4 and 5 are located at the same height and preferably interconnected by a narrow tube 8 to keep the amount of ink contained in each container equal to the other. This allows only one of the containers to be refilled.

Figure 2:
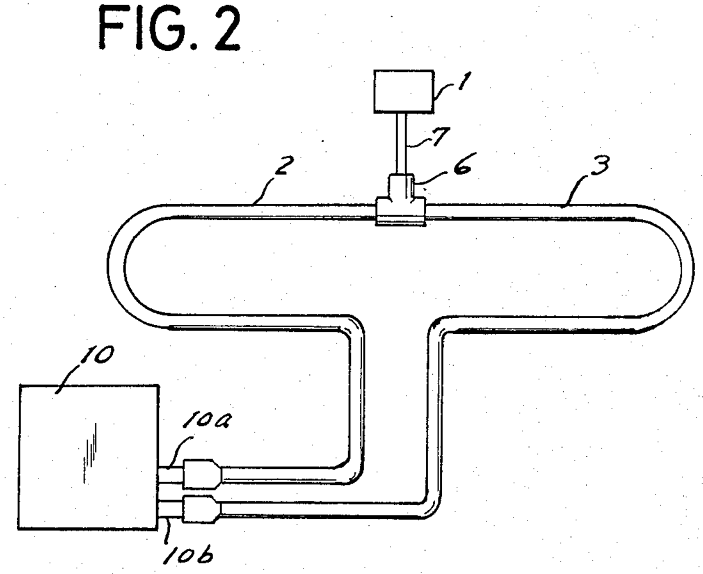
FIG. 2 is a schematic diagram of a modified embodiment of the invention.

The ink containers 4 and 5 may be combined into a single unit as shown in FIG. 2. In this embodiment, the conduits 2 and 3 are connected outlets 10*a* and 10*b* of a container 10 which are sufficiently spaced apart from each other to avoid interference.

Figure 3:
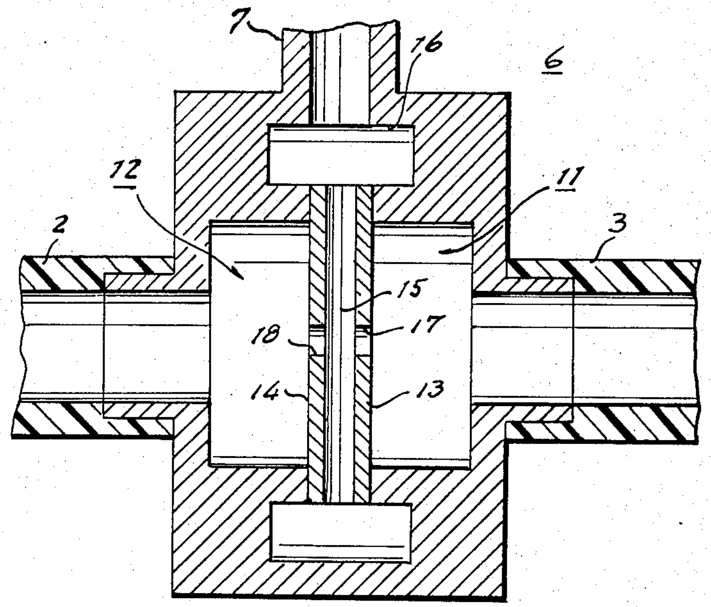
FIG. 3 is a cross-sectional view of the T-joint of FIG. 1.

The effect of the pressure absorption is further enhanced by constructing the T-joint 6 in a manner as illustrated in FIG. 3. The T-joint 6 comprises first and second cylindrical chambers 11 and 12 which are divided by spaced apart separating discs 13 and 14 and respectively coupled with the supply conduits 2 and 3. The separating discs 13 and 14 form a common passageway 15 therebetween which is connected 15 to an annular chamber 16 and thence to the conduit 7. The first and second chambers 11 and 12 are connected by a connecting channel formed by axially aligned orifices 17 and 18. By appropriately dimensioning the cross-sectional areas of the connecting orifices 17, 18 in relation to the cross-sectional area of each of the chambers 11 and 12, it is possible to minimize the pressure variation in the common passage 7 substantially to zero.

Figure 4:
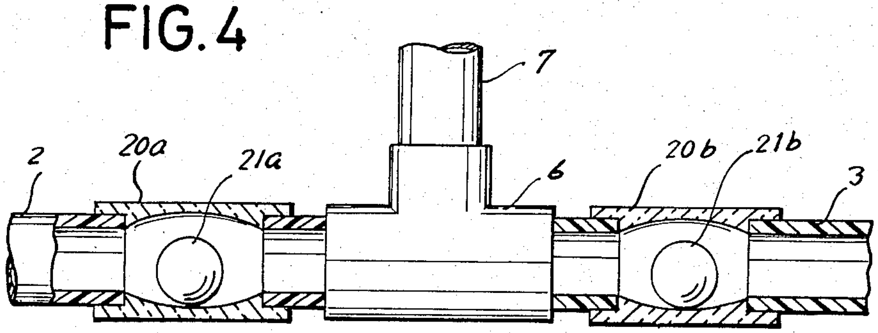
FIG. 4 is a cross-sectional view of a further preferred embodiment of the invention.

The effect of pressure absorption is still further enhanced by the employment of a pair of novel check valve arrangements 20*a* and 20*b* of identical structure shown in FIG. 4. The check valve arrangements 20*a* and 20*b* are disposed in conduits 2 and 3, respectively, adjacent the T-joint 6. Each check valve arrangement comprises an open-ended tubular members 20*a* and 20*b* of a plastic material having smaller inner diameter portions at the opposite ends thereof and a larger inner diameter portion between them. Inside the tube 20 is movably provided a spherical member or ball 21 formed of steel or the like. The ball 21 has a diameter larger than the smaller inner diameters of tube 20 but smaller than the larger diameter, so that it is freely movable between the opposite ends of the tube under the pressure of ink and the ink may pass through the valve arrangement.

When the head 1 reverses its direction of motion at the left end the line scan, the ball 21*a* is moved to the right end of the tube 20*a* under the pressure increase in conduit 2, closing the tube 20*a* and the ball 21*b* is pulled to the right end of the tube 20*b* under the pressure decrease in conduit 3, thereby closing the tube 20*b*. When the head makes a reversal at the right end of its travel, the balls 21*a* and 21*b* move to the left ends of the tubes closing the liquid passages. Therefore, the undesirable pressure variations are prevented from affecting the pressure at the common liquid passageway 7 by the check valve arrangements 20*a* and 20*b*.

During the time the head is moving at a constant speed for printing, the balls 21*a* and 21*b* move to the larger diameter portions of the respective tubes to allow the supply ink to pass therethrough to the printer head.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. A liquid supply system for a nonimpact printer having a printer head arranged to reciprocate along a scan line, comprising:

first and second liquid containers for holding liquid therein and acting as a pressure absorber for nullifying rapid liquid pressure variations applied thereto when said printer head makes sharp turns at opposite ends of said scan line;

a pair of first and second identical, flexible conduits respectively connected to said first and second liquid containers; and a T-joint mounted for unitary movement with said printer head, the T-joint having a first passageway connected at one end to said printer head, and a second passageway connected to said first passageway at a point intermediate the length thereof, said second passageway being connected at opposite ends to said first and second flexible conduits respectively, the cross-section of each of said first and second passageways being smaller than the cross-section of said first and second conduits to prevent said pressure variations from being transmitted to said printer head.

2. A liquid supply system as claimed in claim 1, wherein said first and second liquid containers are located at equal heights.

3. A liquid supply system as claimed in claim 2, wherein said first and second liquid containers are interconnected for communicating liquid between said first and second containers.

4. A liquid supply system as claimed in claim 1, wherein said first and second liquid containers are interconnected for communicating liquid between said first and second containers.

5. A liquid supply system as claimed in claim 1, further comprising first valve means located in said first conduit and second valve means located in said second conduit, each of said valve means comprising:

a tubular member having opposite open ends and an intermediate portion with a larger cross-sectional area than the cross-sectional area of each said open end; and a valve member freely movable in said tubular member between said open ends for closing one of said open ends under the pressure of liquid in the respective one of said conduits.

6. A liquid supply system as claimed in claim 5, wherein said first and second valve means are located adjacent said T-joint.

7. A liquid supply system as claimed in claim 5, wherein said valve member comprises a spherical member.

8. A liquid supply system as claimed in claim 1, wherein said T-joint is formed by a pair of first and second identical chambers respectively connected to said first and second conduits, a connecting channel being said second passageway by which said first and second chambers are interconnected, the cross-section of said connecting channel being smaller than the cross-section of said first and second chambers.

9. A nonimpact printer comprising:

first and second liquid containers for holding liquid therein and acting as pressure absorbers for nullifying rapid liquid pressure variations;

a pair of first and second identical, flexible conduits each being connected at one end thereof to one of said first and second liquid containers, respectively;

an ink jet printer head operable in response to an electrical signal applied thereto for ejecting liquid and movable reciprocably along a print line; and a T-joint mounted for unitary movement with said printer head, the T-joint having a first passageway connected at one end to said printer head for supplying liquid thereto, and a second passageway connected at an intermediate point thereof to the other end of said first passageway, the opposite ends of said second passageway being connected respectively to the other ends of said first and second flexible conduits, the cross-section of each of said first and second passageways being smaller than the cross-section of said first and second conduits.

10. A nonimpact printer as claimed in claim 9, wherein said first and second liquid containers are located at equal height.

11. A nonimpact printer as claimed in claim 10, wherein said first and second liquid containers are interconnected for communicating liquid between said first and second containers.

12. A nonimpact printer as claimed in claim 9, wherein said first and second liquid containers are interconnected for communicating liquid between said first and second containers.

13. A nonimpact printer as claimed in claim 9, further comprising first valve means located in said first conduit and second valve means located in said second conduit, each of said valve means comprising:

a tubular member having opposite open ends and an intermediate portion with a larger cross-sectional area than the cross-sectional area of each said open end; and a valve member freely movable in said tubular member between said open ends for closing one of said open ends in response to a pressure variation in the respective one of said conduits.

14. A nonimpact printer as claimed in claim 13, wherein said first and second valve means are located adjacent said T-joint.

15. A nonimpact printer as claimed in claim 13, wherein said valve member comprises a spherical member.

16. A liquid supply system as claimed in claim 9, wherein said T-joint is formed by a pair of first and second identical chambers respectively connected to said first and second conduits, a connecting channel being said second passageway by which said first and second chambers are interconnected, the cross-section of said connecting channel being smaller than the cross-section of said first and second chambers.

* * * * *